(12) United States Patent
Li

(10) Patent No.: US 10,979,548 B2
(45) Date of Patent: Apr. 13, 2021

(54) PHONE HOLDER

(71) Applicant: SHENZHEN BAISHENG PROTOTYPE CO., LTD., Guangdong (CN)

(72) Inventor: Ming Li, Guangdong (CN)

(73) Assignee: SHENZHEN BAISHENG PROTOTYPE CO., LTD., Shenzhen (CN)

( * ) Notice: Subject to any disclaimer, the term of this patent is extended or adjusted under 35 U.S.C. 154(b) by 0 days.

(21) Appl. No.: 16/630,863

(22) PCT Filed: Aug. 30, 2017

(86) PCT No.: PCT/CN2017/099763
§ 371 (c)(1),
(2) Date: Jan. 14, 2020

(87) PCT Pub. No.: WO2019/041189
PCT Pub. Date: Mar. 7, 2019

(65) Prior Publication Data
US 2020/0153953 A1 May 14, 2020

(51) Int. Cl.
*H04M 1/04* (2006.01)
*B60R 11/02* (2006.01)

(52) U.S. Cl.
CPC ........... *H04M 1/04* (2013.01); *B60R 11/0241* (2013.01)

(58) Field of Classification Search
CPC ................. H04M 1/04; B60R 11/0241; B60R 2011/0063; B60R 2011/0056; B60R 2011/0071; B60R 11/02
See application file for complete search history.

(56) References Cited

U.S. PATENT DOCUMENTS

| 9,344,136 | B2* | 5/2016 | Richter | H04M 1/04 |
| 9,813,533 | B1* | 11/2017 | Ye | H04M 1/04 |
| 2011/0233155 | A1* | 9/2011 | Hui | B60R 11/02 211/26 |
| 2016/0065705 | A1* | 3/2016 | Nam | A47G 19/2227 455/575.8 |
| 2017/0021773 | A1* | 1/2017 | Brown | B60R 7/04 |
| 2018/0252358 | A1* | 9/2018 | Yang | F16M 13/00 |

FOREIGN PATENT DOCUMENTS

| CN | 203623547 U | 6/2014 |
| CN | 206124916 U | 4/2017 |

* cited by examiner

*Primary Examiner* — Tuan D Nguyen

(57) ABSTRACT

Disclosed is a phone holder, comprising a vertical wall, a base, and a clamping slot in the vertical wall for positioning a phone. A bottom surface of the clamping slot has an inclined surface in contact with the edge of the phone, such that the phone automatically slides to a clamping and positioning position when placed in the clamping slot, thus making it very convenient to place or access the phone. In addition, when the phone slides to the clamping and positioning position in the clamping slot, three contact points can be formed with an internal surface of the clamping slot, and the three contact points can form a three-point clamping and positioning effect for the phone, such that the phone can still be stably fixed in the holder in the case where the phone holder is shaking.

10 Claims, 3 Drawing Sheets

PHONE HOLDER

TECHNICAL FIELD

The present invention relates to the field of phone accessories, in particular to a phone holder.

BACKGROUND

The development of electronic technology and network communication technology enables smart phones to be popularized in daily life. Most of the smart phones now available on the market have thin bodies and large-panel glass touch screens, and are used in various occasions due to their convenient operations and high intelligence. For example, when a driver uses a smart phone on a vehicle, he is in a potential safety hazard if holding the phone with a single hand, therefore, a phone holder for fixing a smart phone becomes a favorite accessory for many drivers. Patent document (201320882917.X) published a vehicle-mounted phone holder which can be adjusted electrically. A left and a right side of a fixed part of a phone are provided with a fixture which can be adjusted according to the size of a phone. The phone holder provided with a fixture is complicated in structure and troublesome in operations, and the fixture device has some damage to the phone structure. Patent document (201521098300.4) published a phone holder device and a vehicle-mounted phone holder system, wherein a narrow-mouthed clamping slot on the holder and a cambered surface on the bottom part of the clamping slot coordinate to fix a phone. This structure seriously squeezes phone screen, and access of the phone is complicated. Therefore, it is the pursuit of designers to provide a vehicle-mounted phone holder which is reliable in fixation, convenient to access and harmless to a phone.

SUMMARY OF THE INVENTION

The present invention mainly aims at solving the technical problem of how to overcome shortcomings of complicated structure of a phone holder, inconvenient access of a phone and damage to a phone in the prior art.

The present invention provides a novel phone holder, including:

a vertical wall; and a clamping slot which extends from a top part of the vertical wall to a bottom part, wherein an inner surface of the clamping slot is defined by a first side face, a second side face and a bottom surface arranged at the bottom part of the clamping slot, the first side face is formed with a first contact point which is configured to contact with a front side/reverse side of the phone when the phone is placed in the clamping slot, and the second side face is formed with a second contact point which is configured to contact with a corresponding reverse side/front side of the phone when the phone is placed in the clamping slot; a segment, in contact with an edge of the phone, of the bottom surface when the phone is placed in the clamping slot has an inclined surface, and the inclined surface enables the phone to automatically slide to a third contact point on the bottom surface when the phone is placed in the clamping slot, and enables the phone to be subjected to three-point positioning through the first contact point, the second contact point and the third contact point.

As to the phone holder according to the present embodiment, due to a unique designed structure of a clamping slot, when the phone is placed in a clamping slot in an inclined manner, an edge of the phone automatically slides to a clamping and positioning position on the inclined surface. At this time, the phone is fixed based on three contact points, in contact with a front side, a reverse side and a bottom edge of the phone, on the clamping slot. Such a fixation manner can effectively avoid falling off of a phone caused in a shaking process of a phone holder, and the phone can be conveniently accessed from the phone holder, and will not be influenced by the extrusion force at contact points.

DETAILED DESCRIPTION OF THE EMBODIMENTS

Figure 1:
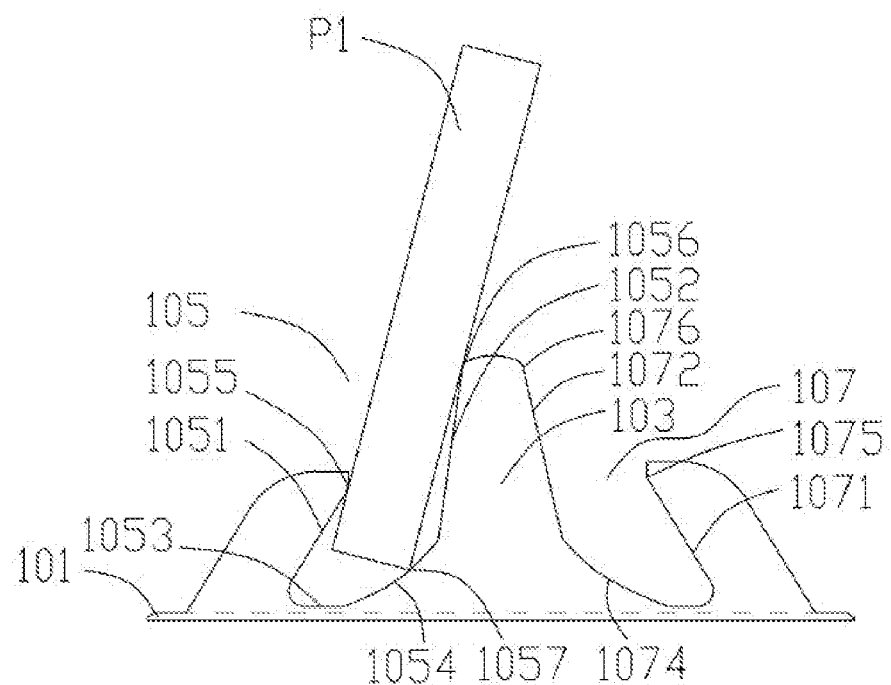
FIG. 1 is a side-view structural diagram of a phone holder in Embodiment 1.

The present invention will be further described below in detail through specific embodiments and in combination with accompanying drawings. Wherein similar elements in different embodiments adopt related similar element reference numerals. In the following embodiments, many detailed descriptions are for a better understanding of the present application. However, those skilled in the art can effortlessly recognize that, part of the features can be omitted under different conditions, or can be substituted by other elements, materials or methods. In certain conditions, some related operations in the present application are not displayed or described in the description, and this is to prevent core parts of the present application from being overwhelmed by too many descriptions. However, to those skilled in the art, detailed description of these related operations is not necessary, and related operations can be completely understood by those skilled in the art according to illustrations in the description and ordinary technical knowledge in the art.

In the text, the serial numbers for the parts themselves, for example, first, second and the like, are merely used for distinguishing the described object, and have no any sequential or technical meanings. However, unless otherwise specifically illustrated, the connection and coupling in the present application both include direct and indirect connection (coupling).

For the existing phone holder, a positioning method in which line and point are combined is mostly adopted, that is, one line and one point are available at the part at which a side face of a phone holder is in contact with the phone, or two lines are available at the contact part. Although this positioning method satisfies the theories that "one line and one point determine one surface" and "two intersecting lines determine one surface" in geometry, however, in reality, a phone may generally slide relatively along the contact line, such that the positioning effect of a phone is poor.

In embodiments of the present invention, a geometric theory of three-point positioning is adopted, that is, three points determine a plane in geometry. Moreover, three points constitute a geometric relationship of a triangle on a plane, thereby being more beneficial for stability of a geometry on a plane, and a clamping slot designed according to the theory also accomplishes a better positioning effect of a phone.

Embodiment 1

Figure 2:
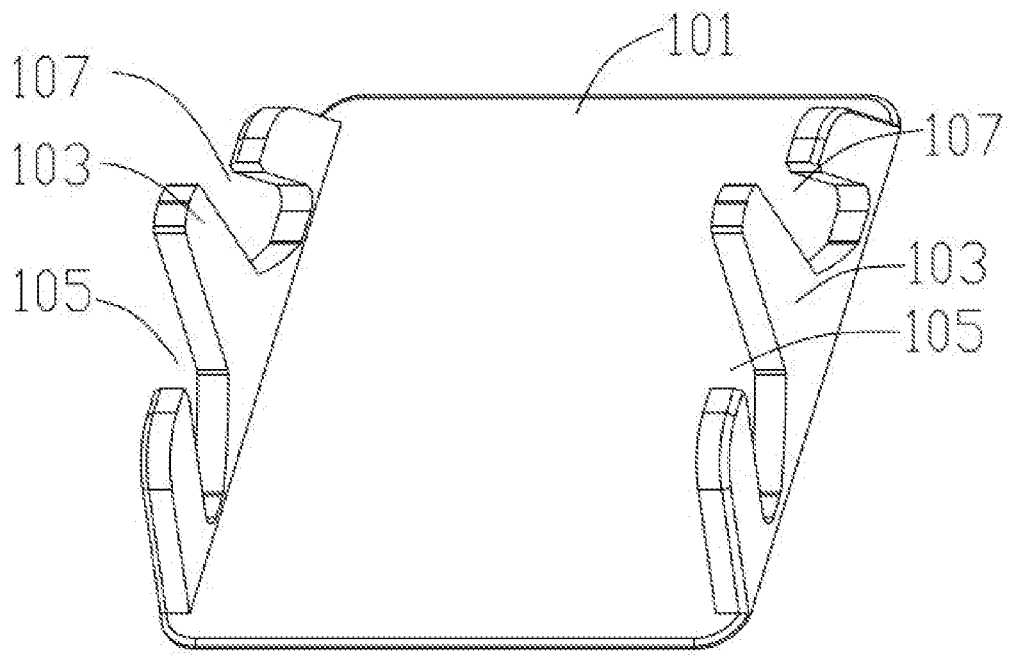
FIG. 2 is a perspective-view structural diagram of a phone holder in Embodiment 1.

A side-view structure of a phone holder is as shown in FIG. 1 and a perspective view is as shown in FIG. 2.

The phone holder includes a base 101, a vertical wall 103, a first clamping slot 105 and a second clamping slot 107.

In the present embodiment, the first clamping slot 105 and the second clamping slot 107 are formed on the vertical wall 103 and the two are of a completely symmetrical structure. A user can select to place the phone in the first clamping slot 105 or in the second clamping slot 107 according to his own actual requirement.

In the present embodiment, only the structure and the use method of the first clamping slot 105 are specifically introduced, while for the structure and use method of the second clamping slot 107, please refer to the first clamping slot 105. In addition, to facilitate description of the structure of the first clamping slot 105, a phone P1 in a clamping and positioning position is added for assisted introduction.

As shown in FIG. 1, the first clamping slot 105 includes a first side face 1051, a second side face 1052 and a bottom surface 1053 arranged at the bottom part of the first clamping slot 105. The first clamping slot 105 extends from a top part of the vertical wall 103 to a bottom part, and an inner surface of the first clamping slot 105 is defined by a first side face 1051, a second side face 1052 and a bottom surface 1053. The first side face 1051 is formed with a first contact point 1055 which is configured to contact with a front side/reverse side of the phone P1 when the phone P1 is placed in the first clamping slot 105, and the second side face 1052 is formed with a second contact point 1056 which is configured to contact with the reverse side/front side of the phone P1 when the phone P1 is placed in the first clamping slot 105. The segment, in contact with an edge of the phone P1, of the bottom surface 1053 when the phone P1 is placed in the first clamping slot 105 is an inclined surface 1054, and the inclined surface 1054 enables the phone P1 to automatically slide to a third contact point 1057 on the bottom surface 1053 when the phone P1 is placed in the first clamping slot 105, and enables the phone P1 to be subjected to three-point positioning through the first contact point 1055, the second contact point 1056 and the third contact point 1057.

In the present embodiment, a top part of the first side face 1051 extends towards the direction in which the second side face 1052 is located, and an inserting port of the phone P1 exists between the top part of the first side face 1051 and the second side face 1052. The first contact point 1055 is arranged on a top part of the first side face 1051, and the second contact point 1056 is arranged on a top part of the second side face 1052.

In the present embodiment, the height of the first contact point 1055 is less than the height of the second contact point 1056, thereby ensuring that the phone P1 reaches a suitable inclined angle, preventing the first side face 1051 from excessively shielding the front side/reverse side of the phone P1, and giving consideration to practicability and aesthetics of the phone holder. The inclined surface 1054 is an inclined flat surface or an inclined curved surface, and in the present embodiment, an inclined curved surface is preferably used. This is because the slope of a curved surface formed by the inclined curved surface is relatively large, which is beneficial for generating a better sliding effect when an edge of the phone P1 contacts with the inclined surface 1054.

As shown in FIG. 2, the phone holder is provided with two vertical walls. Please refer to 103 in FIG. 2, the structural shapes and sizes of the two vertical walls are completely consistent, and the two vertical walls are respectively vertically connected to edges on two ends of a base 101, and are of a completely symmetrical structure. The two vertical walls are respectively provided with two clamping slots, please refer to 105 and 107 in FIG. 2. The structural shapes and sizes of the two first clamping slots 105 are completely consistent, for fixing a phone in a coordinated manner. Similarly, the shapes and sizes of the two second clamping slots 107 are also completely consistent, also for fixing a phone in a coordinated manner.

In the present embodiment, the vertical wall 103 and the base 101 are preferably made of aluminum alloy materials, to facilitate mould opening and lathe machining. The vertical wall 103 is vertically connected to the base 101 in a fixed or detachable manner. The fixed connecting manner includes welding, metal bending connection, riveting, and cold welding, and the detachable connecting manner includes pin joint, buckling connection and adhesive bonding. In addition, the vertical wall 103 is covered with plastics, to wrap corners on an inner surface of the first clamping slot 105 and the second clamping slot 107, and to further prevent the phone from being scratched in a process of placing the phone in the first clamping slot 105 or the second clamping slot 107. The bottom surface of the base 101 can be adhered with double-sided pastes, surface-grinded plastics or sucking disks for fixing the base onto a certain flat surface or curved surface in such manners as adhesion, friction and adsorption, for example, fixed onto a desktop or a certain tabletop in a car.

In another embodiment, the first clamping slot 105 and the second clamping slot 107 are of an incomplete symmetric structure, that is, the two are of difference in structures. The second clamping slot 107 includes a third side face 1071, a fourth side face 1072, an inclined surface 1074 and a fourth contact point 1075 and a fifth contact point 1076 which are in contact with the front side/reverse side of the phone. The two clamping slots have the following differences: the relative positions between the first contact point 1055 and the fourth contact point 1075 are different, or the relative positions between the second contact point 1056 and the fifth contact point 1076 are different, or the curvature of the inclined surface 1054 is different from the curvature of the inclined surface 1074, or the inclined angle of the first side face 1051 is different from the inclined angle of the third side face 1071, or the inclined angle of the second side face 1052 is different from the inclined angle of the fourth side face 1072. The above conditions will lead to a difference in inclined angles of phones when phones of the same thickness are placed in two clamping slots, for example, when the first contact point 1055 has a greater height than the fourth contact point 1075, the inclined angle of the phone P1 will become less by comparison.

Figure 3:
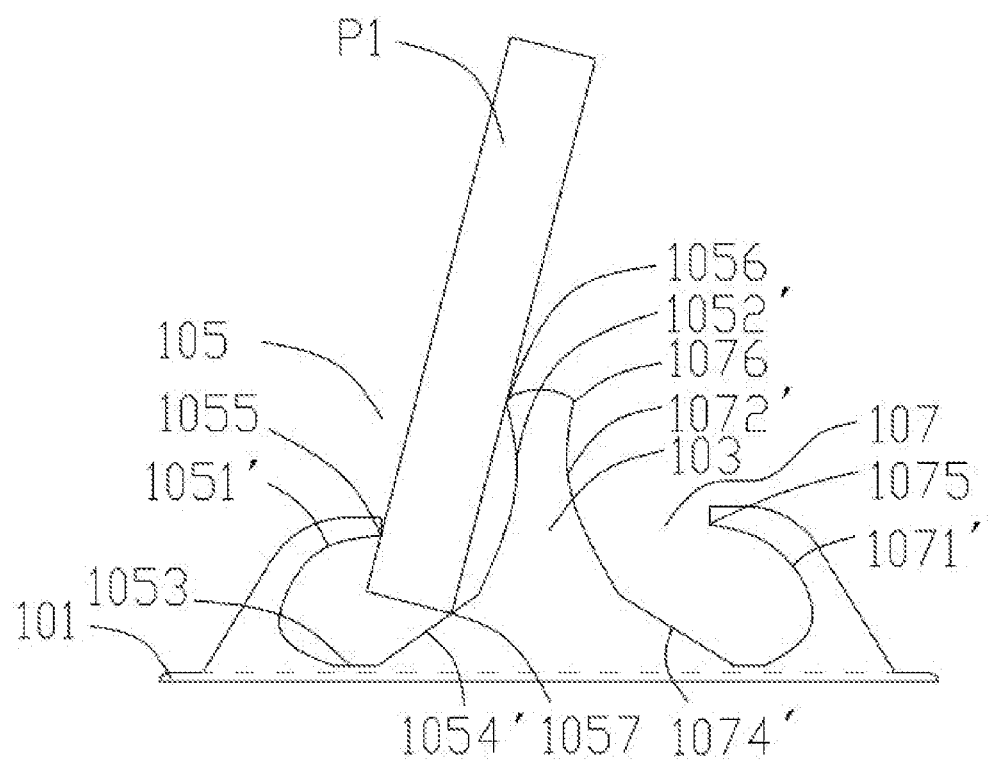
FIG. 3 is a side-view structural deformation diagram of a phone holder in Embodiment 1.

In another embodiment, the side-view structure of a phone holder is as shown in FIG. 3, and the structural shapes of the first clamping slot 105 and the second clamping slot 107 are changed. The first side face 1051' and the second side face 1052' are inclined cambered surfaces which are concave upwards, and this structure is beneficial for respectively reducing the width of the protruding entity in which the first contact point 1055 and the fourth contact point 1075 are located, and further respectively weakening the shielding effect of the protruding entity in which the first contact point 1055 and the fourth contact point 1075 are located on the front side/reverse side of the phone. The third side face 1071' and the fourth side face 1072' are inclined cambered surfaces which are concave towards a symmetric midline direction of the vertical wall 103, thereby being beneficial for enlarging the width (that is, the width of the inserting port of the phone) of the opening between a top end of the first side face 1051' and the second side face 1052', also beneficial for enlarging the width of the inserting port of the phone of the second clamping slot 107 similarly, such that the phone can be more conveniently placed in the first clamping slot 105 or the second clamping slot 107. The inclined surface 1054' is an inclined flat surface, thereby being beneficial for enlarging the height of the third contact point 1057', that is, being beneficial for reducing the inserting depth of the phone P1 in the first clamping slot 105, so as to weaken the shielding effect of the protruding entity in which the first contact point 1055 is located on the front side/reverse side of the phone. Similarly, the inclined surface 1074' of the second clamping slot 107 can also be an inclined flat surface.

In another embodiment, the vertical wall 103 and the base 101 can be made of other metal materials, and can also be made of plastics. In addition, a wider spacing can be reserved between the first clamping slot 105 and the second clamping slot 107 on the same vertical wall, thereby avoiding influence from touching between phones when two phones are respectively placed in two clamping slots.

Embodiment 2

Figure 4:
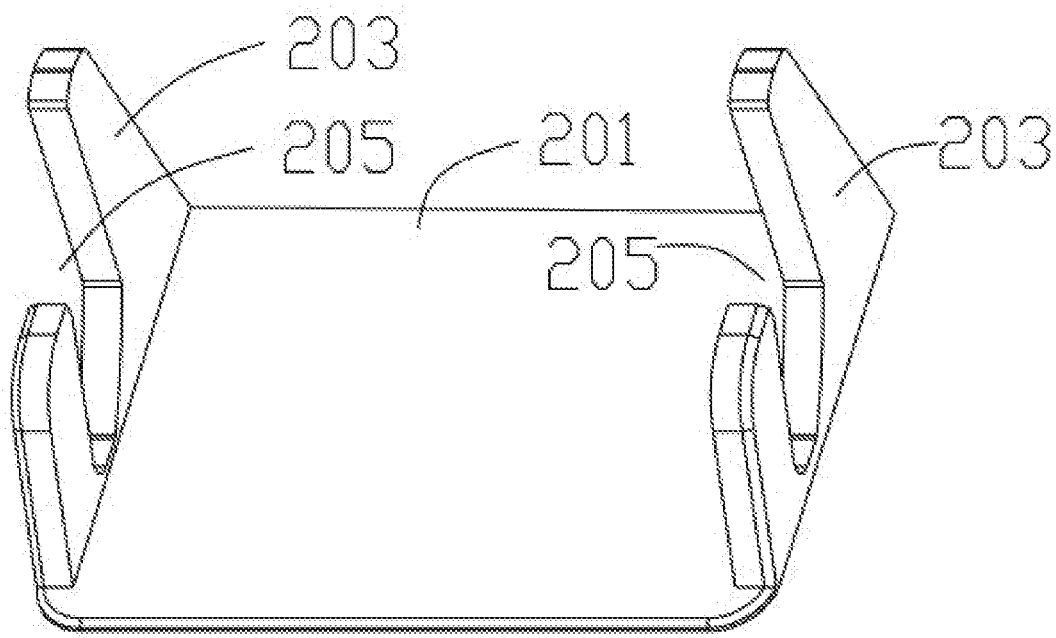
FIG. 4 is a perspective-view structural diagram of a phone holder in Embodiment 2.

A perspective view of a phone holder is as shown in FIG. 4.

In the present embodiment, the phone holder includes a base 201, a vertical wall 203, and a clamping slot 205 formed on the vertical wall 203. The phone holder has two vertical walls with the same structural shape and size, similarly, the two clamping slots corresponding to the two vertical walls also have the same structural shape and size. The two vertical walls are respectively connected to edges at two sides of the base 201 and are of a symmetrical structure to fix a phone in a coordinated manner.

In the present embodiment, since the structure of the vertical wall 203 is only a part of the vertical wall 103 in Embodiment 1, therefore, the phone holder in the present embodiment belongs to a simplified type of the phone holder in Embodiment 1 and is used for fixing a phone. In addition, in the present embodiment, the structure of the clamping slot 205 can be completely consistent with the structure of the first clamping slot 105 in Embodiment 1.

In the present embodiment, for the connecting manner between a vertical wall 203 and a base 201 and for a fixed manner between a base 201 and a certain flat surface or curved surface, please completely refer to the base 101 and the vertical wall 103 in Embodiment 1, and the above connecting manner and fixed manner will not be repeated redundantly herein.

Embodiment 3

Figure 5:
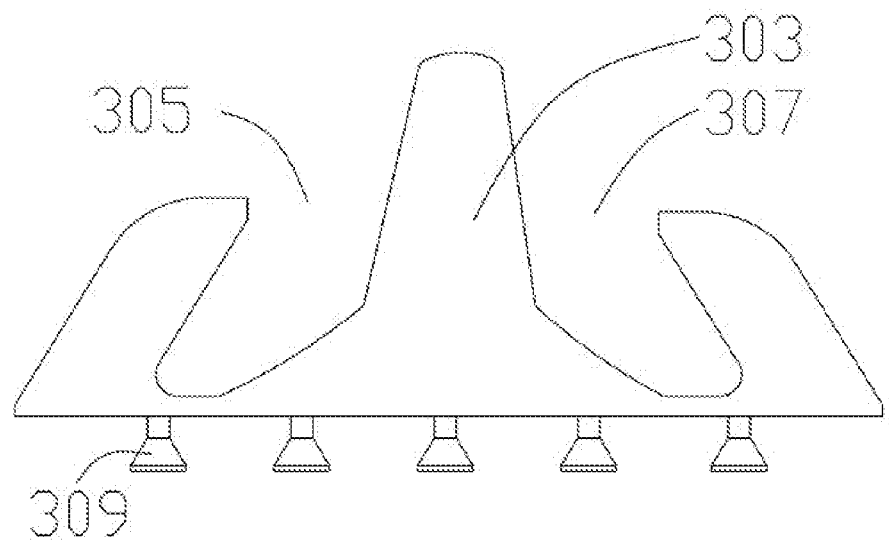
FIG. 5 is a side-view structural diagram of a phone holder in Embodiment 3.
Figure 6:
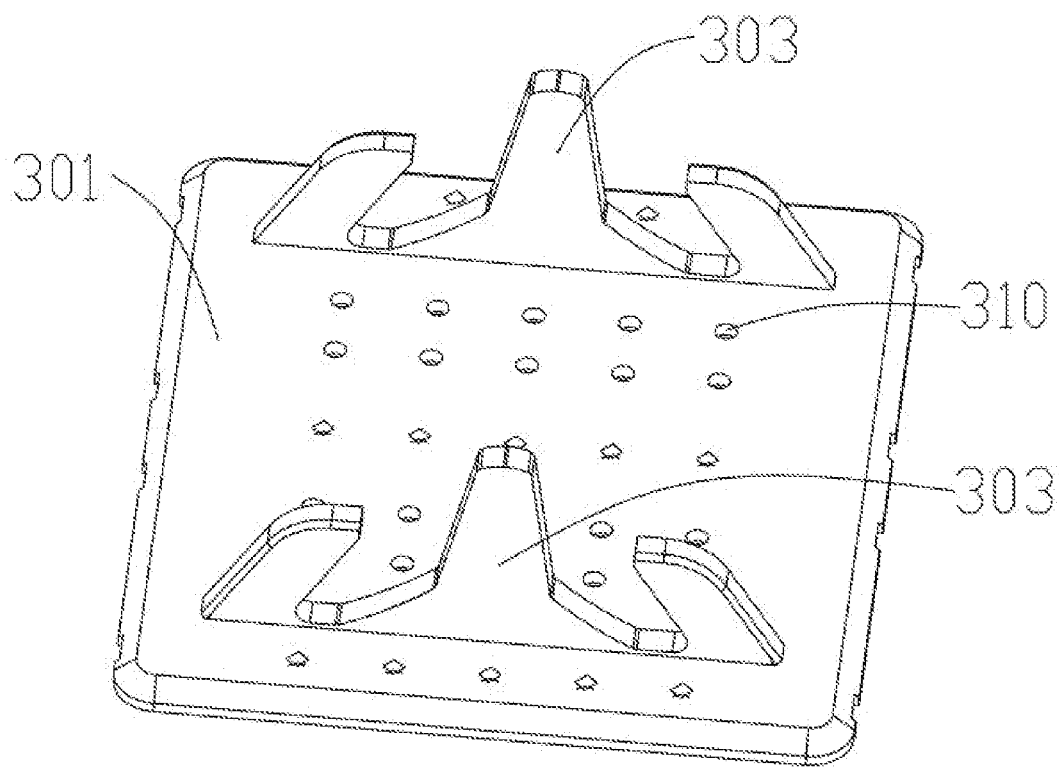
FIG. 6 is a perspective-view structural diagram of a phone holder in Embodiment 3.

A side-view structure of a phone holder is as shown in FIG. 5 and a perspective view is as shown in FIG. 6.

A phone holder includes a base 301, a vertical wall 303, a positioning frame 309, and clamping slots 305 and 307 formed on the vertical wall. The structure formed by the vertical wall 303 and the clamping slots 305 and 307 on the vertical wall 303 is the same as the structure of the vertical wall 103 in Embodiment 1. Therefore, the structure of the vertical wall 303 will not be repeated redundantly herein. Multiple positioning frames 309 are available and are uniformly distributed on a lower end face of the vertical wall 303, and are connected with the vertical wall 303 in a fixed or detachable manner.

In the present embodiment, please refer to FIG. 5, the positioning frame 309 is a composite structure with a cylinder on the upper part and a cone on the lower part, and a conical circular cross section is formed on the lower end. The positioning frame 309 is made of aluminum alloy materials. The cylindrical structure has a relatively small diameter and an external thread on an upper end, and can be spirally connected to a lower end face of the vertical wall 303. In the present embodiment, five positioning frames 309 are distributed uniformly, and the conical structure of the positioning frame 309 can be inserted into a corresponding jack 310 of the base 301, thereby ensuring stability of the detachable connection of the vertical wall 303 to the base 301.

In the present embodiment, please refer to FIG. 6, the phone holder further includes jacks 310 formed on the base 301. The jacks 310 are uniformly distributed on the base 301, and form a cut-through structure, and nine rows of jacks are available, with five jacks in each row. The base 301 is made of plastic materials, such that the jack 310 has an expandable aperture. Meanwhile, the bottom surface of the base 301 is provided with double-sided pastes, surface-grinded plastics or sucking disks for fixing the base 301 onto a certain flat surface or curved surface in such manners as adhesion, friction and adsorption, for example, fixed onto a desktop or a certain tabletop in a car. The spacing between jacks in each row corresponds to the spacing of the positioning frames 309, such that the positioning frames 309 can be smoothly inserted into the jack 310. At least two vertical walls 303 are available, and are fixed on the bottom surface 303 through the effect of a positioning frame.

In the present embodiment, a user can insert and extract a vertical wall 303 according to his own requirement, and freely adjust the relative positions of the two or more vertical walls 303, so as to place phones of different widths (or lengths) in the clamping slot 305 or 307.

Specific examples are used above to illustrate the present invention, which are merely for helping to understand the present invention, rather than limiting the present invention. For those skilled in the art of the present invention, numerous simple deductions, transformations or substitutions can also be made in accordance with the idea of the present invention.

The invention claimed is:

1. A phone holder, comprising:
   a vertical wall; and
   a clamping slot which extends from a top part of the vertical wall to a bottom part, wherein an inner surface of the clamping slot is defined by a first side face, a second side face and a bottom surface arranged at the bottom part of the clamping slot,
   the first side face is formed with a first contact point which is configured to contact with a front side/reverse side of a phone when the phone is placed in the clamping slot, and
   the second side face is formed with a second contact point which is configured to contact with a corresponding reverse side/front side of the phone when the phone is placed in the clamping slot;
   a segment, in contact with an edge of the phone, of the bottom surface when the phone is placed in the clamping slot has an inclined surface, and the inclined surface enables the phone to automatically slide to a third contact point on the bottom surface when the phone is placed in the clamping slot, and enables the phone to be subjected to three-point positioning through the first contact point, the second contact point and the third contact point.

2. The phone holder of claim 1, wherein a top part of the first side face extends towards the direction in which the second side face is located, and an inserting port of the phone exists between the top part of the first side face and the second side face.

3. The phone holder of claim 2, wherein the first contact point is arranged on the top part of the first side face, and the second contact point is arranged on a top part of the second side face.

4. The phone holder of claim 3, wherein the height of the first contact point is less than the height of the second contact point.

5. The phone holder of claim 4, wherein the inclined surface is an inclined flat surface or an inclined curved surface.

6. The phone holder of claim 5, further comprising a base, wherein the vertical wall is vertically connected to the base in a fixed or detachable manner.

7. The phone holder of claim 6, wherein the vertical wall is provided with two clamping slots.

8. The phone holder of claim 7, wherein the vertical wall and the base are made of aluminum alloy materials.

9. The phone holder of claim 8, wherein the inner surface of the clamping slot is provided with plastic materials to wrap a corner on an inner surface of the clamping slot.

10. The phone holder of claim 9, wherein the bottom surface of the base is provided with double-sided pastes, surface-grinded plastics or sucking disks for fixing the base.

* * * * *